(12) United States Patent
Paugstadt

(10) Patent No.: US 6,216,949 B1
(45) Date of Patent: Apr. 17, 2001

(54) PROCESS FOR PROTECTING PRODUCTS AGAINST FORGERY BY MEANS OF MACHINE-READABLE DISTINCTIVE SAFETY FEATURES

(75) Inventor: Ralf Paugstadt, Berlin (DE)

(73) Assignee: Bundesdruckerei GmbH (DE)

( * ) Notice: Subject to any disclaimer, the term of this patent is extended or adjusted under 35 U.S.C. 154(b) by 0 days.

(21) Appl. No.: 09/214,082
(22) PCT Filed: Jun. 25, 1996
(86) PCT No.: PCT/DE97/01353
§ 371 Date: Dec. 23, 1998
§ 102(e) Date: Dec. 23, 1998
(87) PCT Pub. No.: WO98/00298
PCT Pub. Date: Jan. 8, 1998

(30) Foreign Application Priority Data

Jun. 28, 1996 (DE) .............................. 196 27 339

(51) Int. Cl.⁷ ...................................... G06K 7/08
(52) U.S. Cl. ............................ 235/449; 235/487
(58) Field of Search .................... 235/449, 450, 235/375, 383, 385, 487, 491

(56) References Cited

U.S. PATENT DOCUMENTS

| | | | |
|---|---|---|---|
| 3,564,215 | * 2/1971 | Peeples, Jr. et al. | 235/487 |
| 3,959,630 | 5/1976 | Hogberg | 235/487 |
| 4,931,629 | 6/1990 | Frankfurt | 235/488 |
| 4,957,901 | * 9/1990 | Jacobson et al. | 505/1 |
| 5,287,302 | * 2/1994 | Brandelik et al. | 365/161 |

FOREIGN PATENT DOCUMENTS 1-196673  8/1989  (JP) .

* cited by examiner

Primary Examiner—Michael G. Lee
Assistant Examiner—Jared J. Fureman
(74) Attorney, Agent, or Firm—McGlew and Tuttle, P.C.

(57) ABSTRACT

A process is provided for securing products against forgery with machine-readable security features, which guarantees inexpensive security features with a high degree of security against forgery. The product to be secured includes at least one superconductive material possessing defined and reproducible, specific properties in at least one area.

21 Claims, 1 Drawing Sheet

Figure 1:
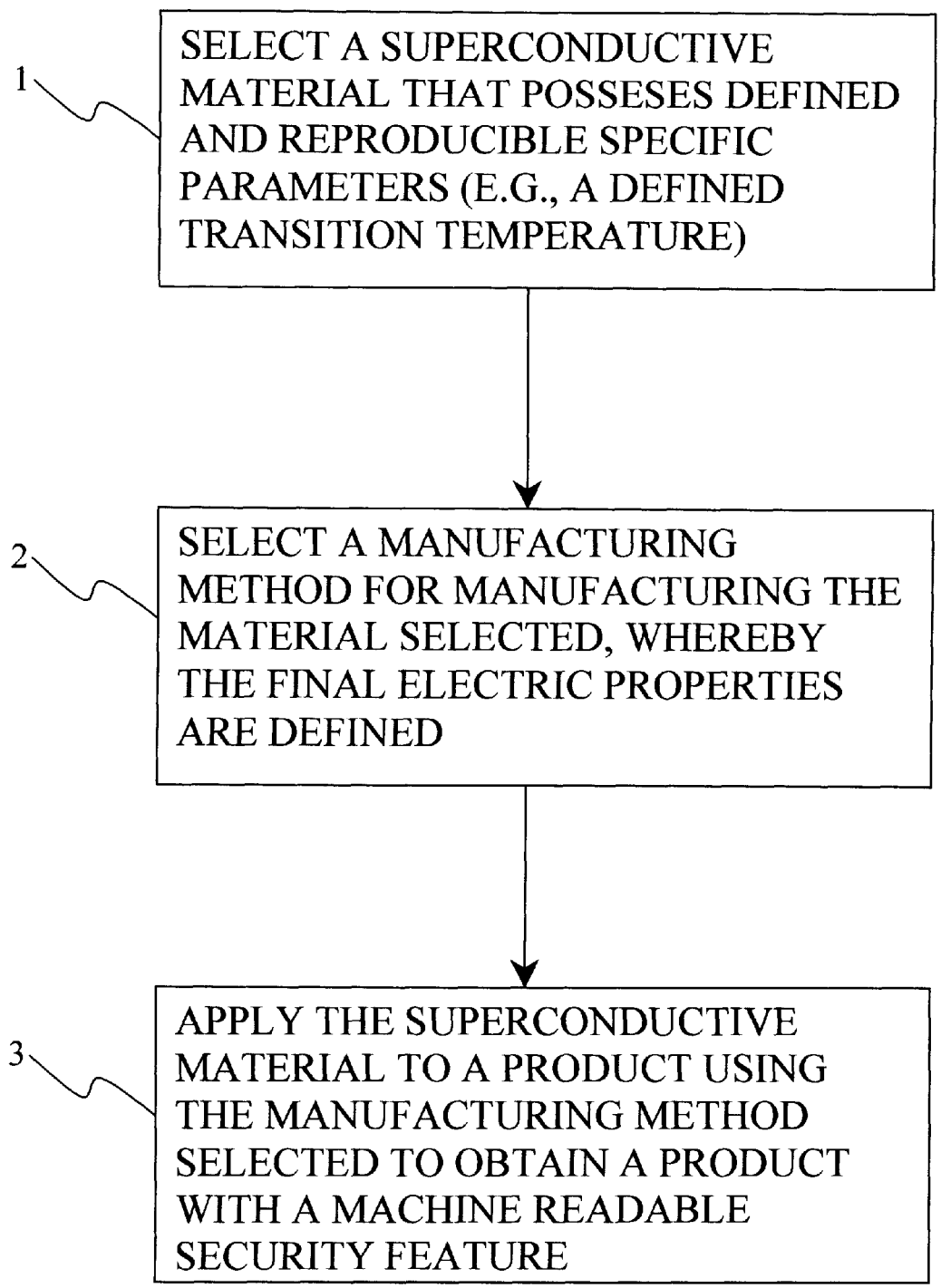

PROCESS FOR PROTECTING PRODUCTS AGAINST FORGERY BY MEANS OF MACHINE-READABLE DISTINCTIVE SAFETY FEATURES

BACKGROUND OF THE INVENTION

1. Field of the Invention

The present invention pertains to a process for securing products against forgery with a machine-readable security feature.

2. Description of the Related Art

In particular, personal documents, banknotes, securities, documents, service cards, such as credit cards or the like, postage stamps, but also other products, such as drugs, spare parts, jewels, generally products that have an economic significance or must be authorized, often can be prepared according to a process that can be easily imitated.

It is desirable in the case of these products to introduce features that make it possible to prove their authenticity, i.e., their originality.

The security features should be connected to the product to be authorized possibly inseparably and/or possess properties that are difficult to reproduce.

The preparation and the use of security features in products belong to the general state of the art.

The machine-readable security features are of particular significance.

Special inks with spectral peculiarities or with magnetic properties or with temperature dependencies (thermochromic inks) are frequently introduced as a security feature into the product to be protected. Bar codes are used, in which the differences in the reflectivity of the surface are utilized, and grid structures or even foil antennas are used to utilize the resonance frequency in a resonant circuit.

The common feature of the prior-art machine-readable security features is that even though they differ in terms of the degree of security against forgery, they can generally be reproduced by varying efforts and very often they can be made optically visible and thus they do not offer sufficient security against forgery.

BRIEF SUMMARY OF THE INVENTION

The primary object of the present invention is to develop a process for securing products against product forgery by providing product machine-readable security features, which guarantees inexpensive security features with a high security against security feature forgery.

According to the invention, a process for securing products against forgery is provided with machine-readable security features. The product to be secured is provided in at least one area with at least one superconductive material possessing defined and reproducible specific parameters.

According to another aspect of the invention, a product is provided formed by a process for securing the product against forgery. The process provides the product with machine-readable security features. A superconductive material possessing defined and reproducible specific parameters is provided either on the product, in the product, as a layer, as an accumulation of particles, as a printed pattern or the like, in the product as a coating or as a layer in a laminar structure.

A security feature, which can be prepared at low cost, is robust and invisible and guarantees the highest possible security against forgery, is provided for any product to be protected due to its superconductive material, which is defined by its specific physical properties and parameters.

The security feature may be provided in the product, on the product, as a layer, as an accumulation of particles, as a printed pattern or the like, in the product as a coating or as a layer in a laminar structure, in any imaginable version.

The security feature is passive, it does not emit any radiation, and it cannot be detected by optical methods or means.

The security feature provides no indication of the underlying security property, as it is given, e.g., in the case of the use of bar codes or film antennas.

Without the knowledge of the verification technology, it gives no indication of the security feature introduced and consequently no assistance for the complete imitation of the product, including its security feature.

The security feature can be prepared according to a very great variety of technologies, e.g., by means of known printing techniques. It may also be prefabricated and be subsequently connected to the product to be protected in the form of a chip or a label or the like.

Security features are characterized in that they possess properties (security properties) that are difficult to reproduce.

The security properties can be set by varying the layer material and its parameters. Forgery would require the reproduction of these properties even in the knowledge of the securing properties.

The security features according to the present invention may be used for all types of products with the highest effectiveness and reliability.

High-temperature superconductors, i.e., superconductors, which pass over into the state of superconduction at comparatively high temperatures (around 100° Kelvin) and can be cooled to their superconduction temperature with simple and inexpensive means, with liquid nitrogen or with refrigerators, have been known since the years 1986/1987.

These superconductors are ceramic or ceramic-like substances which can be deposited or even printed according to various methods, e.g., in thin layers on substrates. The suitable superconductors include, in particular, $YBa_2Cu_3O_{7-delta}$ (YBCO), in which the element yttrium may be replaced with all rare earths except Ce, Pr, Th, and in which the transition temperature of the material can be varied by varying the oxygen content (delta);

$Bi_2Sr_2Ca_1Cu_2O_8$;

$Bi_2Si_2Ca_1Cu_2O_8$;

$Bi_{1.4}P_{0.6}Sr_2Ca_2Cu_3O_{10}$;

$PrBa_2Cu_3O_7/YBa_2Cu_3O_7$; and $Ti_2Ca_2Ba_2Cu_3O_x$.

Especially inexpensive and simple manufacturing methods are required by the bismuth compounds, which also have high stability, are insensitive to moisture and are suitable for use as a security feature.

High-temperature superconductors can be prepared according to various technologies. Depending on the type of processing, they possess different electric properties, which define their field of application.

For example, the uniform coating of surfaces and even of substrates of complicated shapes is possible by means of a special CVD (chemical vapor deposition) method.

BRIEF DESCRIPTION OF THE VIEW OF THE DRAWING

In the drawing:

FIG. 1 is a diagram showing process steps according to the invention.

DETAILED DESCRIPTION OF THE INVENTION

FIG. 1 shows a flow diagram of a process according to invention. The process is used with a product that is to be secured against forgery. At step 1 a superconductive material is selected, which possesses defined and reproducible specific parameters. The reproducible specific parameters may be e.g., a defined transition temperature. At step 2 a manufacturing method is selected for manufacturing the material selected in step 1. With step 2 the final electric properties are defined. Finally, in step 3, the superconductive material of step 1 is applied to the product by using the manufacturing method of step 2. A product comprising a machine-readable security feature is obtained.

The superconductors suitable for use in electronics can be advantageously used in products for securing their originality, in which prefabricated security features are preferably introduced later, e.g., as chips or labels in the case of clothes or service cards, e.g., by bonding, sewing on or by lamination.

Monocrystalline layers of a superconductor are now applied to a substrate, e.g., a chip.

However, superconductive layers are also sufficient, which are printed on or are prepared by dipping. Superconductive material powder, which is dispersed, e.g., in a suitable medium, may be used. Dip-coating and thermal decomposition, screen printing or "gravure offset printing" are suitable as well.

The properties of the various superconductors have been used hitherto with favorable effects in, e.g., electronics, medical engineering, and power engineering.

The following properties of superconductive materials in their superconductive state are utilized according to the present invention, in particular, to secure products:

Reduction of the electric resistance to zero after lowering the transition temperature, shielding of magnetic fields, resonances in the microwave range, reflectivity and absorption of electromagnetic waves.

A high level of security against product forgery is achieved, in particular, if the individual properties of a special superconductor, e.g., its individual transition temperature, its individual critical current intensity, its individual geometry/resonance, or other individual parameters are used to prove authenticity.

As noted above, the superconductors used according to the invention are: $YBa_2Cu_3O_{7-delta}$ (YBCO), in which the element yttrium may be replaced with all rare earths except Ce, Pr, Th, and in which the transition temperature of the material can be varied by varying the oxygen content (delta);

$Bi_2Sr_2Ca_1Cu_2O_8$;

$Bi_2Si_2Ca_1Cu_2O_8$;

$Bi_{1.4}P_{0.6}Sr_2Ca_2Cu_3O_{10}$;

$PrBa_2Cu_3O_7/YBa_2Cu_3O_7$; and $Ti_2Ca_2Ba_2Cu_3O_x$.

Especially inexpensive and simple manufacturing methods are required by the bismuth compounds, which also have high stability, are insensitive to moisture and are suitable for use as a security feature.

The uniform coating of surfaces and even of substrates of complicated shapes is possible by means of a special CVD (chemical vapor deposition) method.

The product to be secured is provided in at least one area with at least one superconductive material possessing defined and reproducible, specific parameters selected from those such as noted above.

Printed products, such as documents, identity cards, securities, credit cards, documents, postage stamps, or the like, may also be provided with a superconductive material possessing defined parameters.

The product or printed product may be coated with the superconductive material at least partially. The printed products may be partially printed on with the superconductive material. The product to be secured may also be connected to an auxiliary part, which was provided with a superconductive material.

The superconductive material may be placed as a monocrystal on a substrate, which is brought into connection as a security feature with the product to be secured by bonding in/on, lamination or the like. The superconductive material may be applied as a geometric pattern.

The parameters characterizing the superconduction can be varied by properly selecting the material composition.

$YBa_2Cu_3O_{7-delta}$ or an equivalent material, whose transition temperature is varied by varying the percentage of oxygen, is a superconductive material particularly useful according to the invention.

The process also includes using the special physical properties and parameters of the superconductive materials to prove the authenticity of the product. To demonstrate the security feature, the superconductive material introduced may be made superconductive by cooling to the transition temperature and the blockage of a magnetic field by the superconductive material is then checked while the temperature drops below the transition temperature. The resonance properties of the superconductive layer applied as a geometric pattern may also be set in the process and subsequently detected. The drop in the electric resistance to zero, the displacement or the blockage of magnetic lines of flux, the change in the absorption of ultrasound and electromagnetic radiation, especially of infrared radiation, the change in the thermal capacity and in the thermal conductivity in the superconductive state of the material at its specific parameters are also used optionally or in their entirety for proof after setting these or selecting these characteristics initially.

While specific embodiments of the invention have been described in detail to illustrate the application of the principles of the invention, it will be understood that the invention may be embodied otherwise without departing from such principles.

What is claimed is:

1. A process for securing products against forgery, the process comprising the steps of:

providing the product with machine-readable security features including at least one area associated with the product with at least one superconductive material possessing defined and reproducible, specific parameters.

2. The process in accordance with claim 1, wherein said product is provided as a printed products including one of documents, identity cards, securities, credit cards, documents, postage stamps, provided with a superconductive material possessing defined parameters.

3. The process in accordance with claim 2, wherein said printed products are at least partially coated with the superconductive material.

4. The process in accordance with claim 2, wherein the printed products are partially printed on with the superconductive material.

5. The process in accordance with claim 1, wherein the product to be secured is connected to an auxiliary part, said auxiliary part being provided with said at least one superconductive material during said step of providing the product with machine-readable security features including at least one area associated with the product.

6. The process in accordance with claim 1, wherein the superconductive material is placed as a monocrystal on a substrate, which is brought into connection as a security feature with the product to be secured by one of bonding in/on, lamination or physical connection.

7. The process in accordance with claim 1, wherein in said step of providing the product with machine-readable security features including at least one area associated with the product the superconductive material is applied as a geometric pattern.

8. The process in accordance with claim 1, wherein a material whose parameters characterizing the superconduction are selected by selecting the material composition and the manufacturing technology is applied as the superconductive material.

9. The process in accordance with claim 1, wherein the superconductive material is $XBa_2Cu_3O_{7-delta}$, X being a rare earth element but not Cu, Pr and Tb, and wherein the transition temperature of the superconductive material is varied by varying the percentage of oxygen.

10. The process in accordance with claim 1, further comprising the step of determining authenticity of the product by checking the special physical properties and parameters of the superconductive materials used on said at least one area associated with the product.

11. The process in accordance with claim 10, wherein to determine the security feature the superconductive material introduced is made superconductive by cooling to a transition temperature and a blockage of a magnetic field by the superconductive material is checked while temperature drops below the transition temperature.

12. The process in accordance with claim 10, wherein resonance properties of the superconductive material applied as a geometric pattern are detected in said step of determining the authenticity.

13. The process in accordance with claim 10, wherein a drop in an electric resistance to zero, a displacement or a blockage of magnetic lines of flux, a change in an absorption of ultrasound and electromagnetic radiation, the change in the absorption of infrared radiation, the change in a thermal capacity and in the thermal conductivity in a superconductive state of the superconductive material at its specific parameters are used optionally or in their entirety for said step of determining authenticity of the product.

14. A process for securing products against forgery by providing the product with machine-readable security features, the process comprising the steps of:
 selecting a superconductive material including selecting defined and reproducible, specific parameters associated with the superconductive material; and
 applying a superconductive material possessing the defined and reproducible, specific parameters to an area associated with the product.

15. The process in accordance with claim 14, wherein said step of applying includes at least one of partially coating the product with the superconductive material, partially printing indicia on the product with the superconductive material, applying superconductive material to at least a portion of an auxiliary part and connecting the auxiliary part with the product, disposing the superconductive material as a monocrystal on a substrate and bringing the substrate into connection with the product, bonding the superconductive material in and/or on the product, laminating a portion of the product with the superconductive material or physically connecting the superconductive material with the product.

16. The process in accordance with claim 15, wherein said step of applying one area associated with the product includes forming a geometric pattern with the superconductive material.

17. The process in accordance with claim 14, wherein said step of selecting includes selecting a material whose parameters characterizing the superconduction are selected by selecting the material composition and the manufacturing technology for manufacturing the material composition selected.

18. The process in accordance with claim 14, wherein the superconductive material is $XBa_2Cu_3O_{7-delta}$, X being a rare earth element but not Cu, Pr and Tb, and wherein the transition temperature of the superconductive material is varied by varying the percentage of oxygen.

19. The process in accordance with claim 14, further comprising the step of determining authenticity of the product by checking the special physical properties and parameters of the superconductive materials used on said at least one area associated with the product, wherein said special physical properties and parameters include at least one of resonance properties of the superconductive layer applied as a geometric pattern, a drop in the electric resistance to zero, a displacement or a blockage of magnetic lines of flux, a change in the absorption of ultrasound and electromagnetic radiation, the change in an absorption of infrared radiation, a change in a thermal capacity and in the thermal conductivity in a superconductive state of the material.

20. The process in accordance with claim 14, further comprising the step of determining authenticity of the product by, making the superconductive material introduced superconductive by cooling to a transition temperature and checking a blockage of a magnetic field by the superconductive material while the temperature is below the transition temperature.

21. A product secured against forgery by providing the product with machine-readable security features, the product being formed by the process comprising the steps of:
 selecting a superconductive material including selecting defined and reproducible, specific parameters associated with the superconductive material; and
 applying a superconductive material possessing the defined and reproducible, specific parameters to an area associated with the product, wherein said step of applying includes at least one of partially coating the product with the superconductive material, partially printing indicia on the product with the superconductive material, applying superconductive material to at least a portion of an auxiliary part and connecting the auxiliary part with the product, disposing the superconductive material as a monocrystal on a substrate and bringing the substrate into connection with the product, bonding the superconductive material in and/or on the product, laminating a portion of the product with the superconductive material or physically connecting the superconductive material with the product.

* * * * *